United States Patent

Summerford et al.

(10) Patent No.: US 8,547,022 B2
(45) Date of Patent: *Oct. 1, 2013

(54) LIGHTING CONTROL SYSTEM FOR A PLURALITY OF LUMINAIRES

(75) Inventors: Robert L. Summerford, Selma, TX (US); Cody Jinkins, Schertz, TX (US); Jeffrey Wilson, Austin, TX (US)

(73) Assignee: Koninklijke Philips N.V., Eindhoven (NL)

( * ) Notice: Subject to any disclaimer, the term of this patent is extended or adjusted under 35 U.S.C. 154(b) by 282 days.

This patent is subject to a terminal disclaimer.

(21) Appl. No.: 13/017,363

(22) Filed: Jan. 31, 2011

(65) Prior Publication Data
US 2011/0187273 A1 Aug. 4, 2011

Related U.S. Application Data

(60) Provisional application No. 61/299,963, filed on Jan. 30, 2010.

(51) Int. Cl.
*H01J 7/24* (2006.01)

(52) U.S. Cl.
USPC .............................. 315/113; 315/250; 315/291

(58) Field of Classification Search
USPC ................. 315/113, 162, 178, 250, 291, 312, 315/324, 360; 362/183, 227, 236, 240, 241, 362/249.01, 257, 362, 800
See application file for complete search history.

(56) References Cited

U.S. PATENT DOCUMENTS

| | | | |
|---|---|---|---|
| 6,909,239 B2 * | 6/2005 | Gauna | 315/134 |
| 7,090,370 B2 * | 8/2006 | Clark et al. | 362/183 |
| 7,163,328 B2 * | 1/2007 | Chang et al. | 362/561 |
| 7,314,291 B2 * | 1/2008 | Tain et al. | 362/294 |
| 7,427,840 B2 | 9/2008 | Morgan | |
| 7,637,637 B2 * | 12/2009 | Liu et al. | 362/294 |
| 7,798,670 B2 * | 9/2010 | Kinnune | 362/217.1 |
| 8,322,893 B2 * | 12/2012 | Nezu | 362/297 |
| 2006/0268544 A1 * | 11/2006 | Rains, Jr. et al. | 362/231 |
| 2007/0120505 A1 * | 5/2007 | Moriyasu et al. | 315/309 |
| 2008/0157697 A1 | 7/2008 | Yang | |
| 2010/0182786 A1 * | 7/2010 | Hein | 362/240 |
| 2010/0208460 A1 * | 8/2010 | Ladewig et al. | 362/235 |
| 2011/0205746 A1 * | 8/2011 | Lundin et al. | 362/373 |

FOREIGN PATENT DOCUMENTS

JP 2009176477 A1 6/2009

* cited by examiner

*Primary Examiner* — Tung X Le (57) ABSTRACT

A lighting control system includes a plurality of luminaires each having a selectively powerable first light source and a selectively powerable second light source. The luminaires are powerable and controllable by a common AC power source. A signal receiving controller of each of the luminaires is electrically connected to the first light source and the second light source and selectively causes power to be routed to either the first light source or the second light source dependent on a control signal sent via the AC power source.

20 Claims, 9 Drawing Sheets

LIGHTING CONTROL SYSTEM FOR A PLURALITY OF LUMINAIRES

CROSS-REFERENCE TO RELATED DOCUMENTS

None

TECHNICAL FIELD

This invention pertains to a lighting control system and more particularly a lighting control system for controlling a plurality of luminaires.

BACKGROUND

Luminaires used for area or outdoor lighting may include a housing that surrounds one or more high intensity discharge (HID) lamps such as, for example, Metal Halide (MH), Pulse Start Metal Halide (PSMH), or High Pressure Sodium (HPS) HID lamp(s). The one or more HID lamps are the sole light source in such luminaires and are typically activated when artificial lighting is needed.

Other luminaires used for area or outdoor lighting may include a housing that surrounds an LED light source having one or more solid state light emitting diodes (LEDs) producing a lumen output similar to that of one or more HID lamps. The one or more LEDs are the sole light source in such luminaires and are typically activated when artificial lighting is needed.

Such luminaires may be coupled with one or more control devices in order to turn the luminaires off when full lighting output is not necessitated and/or to operate the luminaires at a reduced light output level when full lighting output is not necessitated. For example, a controller may be contained within each of the luminaires and be connected via control wiring to a controlling device such as an occupancy sensor, time switch, photocell, or lighting control panel. Each controller may cause the corresponding luminaire to be turned off and/or to operate at a reduced light output dependent on the signal received over the control wiring from the controlling device.

SUMMARY

Generally, in one aspect a lighting control system is provided. The lighting control system includes a plurality of luminaires powerable and controllable by a common AC power source. Each of the luminaires have at least one selectively powerable HID lamp, at least one selectively powerable LED light source, HID electronics electrically connected to the HID lamp, LED electronics electrically connected to the LED light source, and a signal receiving controller electrically connected to the HID electronics and the LED electronics. The signal receiving controller has a power source input selectively electrically connected to the AC power source. Each signal receiving controller selectively causes the power source input to be routed to either the HID electronics or the LED electronics. A lighting controller is electrically coupled with the AC power source remote from the plurality of luminaires. The lighting controller is configured to pulsingly decrease and increase the voltage between the AC power source and the power source input of the signal receiving controller of a plurality of the luminaires, thereby causing a control pulse signal to be generated at the power source input of each the signal receiving controller of a plurality of the luminaires. The signal receiving controller of each of the luminaires is configured to recognize the control pulse signal at the AC power source input and after recognition of the control pulse signal to cause an alternate of the HID electronics and the LED electronics to be routed with the AC power source input.

In some embodiments the HID lamp of each of the luminaires is enclosed in a primary light source housing and the LED light source of each of the luminaires is provided external to the primary light source housing. In some versions of those embodiments the LED light source of each of the luminaires is provided on an arm coupled to the primary light source housing. In some versions of those embodiments the pulse signal is a dual pulse signal, whereby the connection between the AC power source and the power source input of the signal receiving controller of a plurality of the luminaires is removed for a first removal period, then restored for a first restoral period, then removed for a second removal period, and then restored for at least a second restoral period. In some versions of those embodiments the first removal period, the first restoral period, and the second removal period are each at least two seconds in duration. In some versions of those embodiments the lighting control system includes an actuable override signal receiving controller electrically connected to the lighting controller, wherein actuation of the override signal receiving controller causes the lighting controller to pulsingly remove and restore the connection between the AC power source and the AC power source input of the signal receiving controller of a plurality of the luminaires.

Optionally, a transformer may be electrically interposed between the AC power source and the signal receiving controller.

Generally, in another aspect a lighting control system includes a plurality of luminaires each being coupled to a pole. Each of the luminaires have a primary light source housing coupled to the pole, at least one selectively powerable HID lamp enclosed in the primary light source housing and electrically connected to an HID ballast, and a longitudinally extending LED arm assembly extending from the pole. The HID lamp selectively produces a directed HID light output. The LED arm assembly has a selectively powerable secondary LED light source coupled thereto that has a plurality of LEDs electrically connected to at least one driver and selectively producing a directed LED light output. The luminosity of the HID light output is at least two times greater than the luminosity of the LED light output. A signal receiving controller is electrically coupled to an AC power line, the at least one HID ballast, and the at least one driver. The signal receiving controller is operable to electrically route the AC power line to either the at least one HID ballast or the at least one driver dependent on an electrical signal sent over the AC power line.

In some embodiments the LED arm assembly has a downwardly facing bottom surface, the bottom surface supporting the plurality of LEDs. In some versions of those embodiments the bottom surface is substantially planar and is substantially perpendicular to the pole. In some versions of those embodiments the LED arm assembly extends between the pole and the primary light source housing.

In some embodiments the lighting control system further includes an optical sensor in electrical communication with the signal receiving controller of each of the luminaires. In some versions of those embodiments the signal receiving controller prevents power on the AC power line from reaching either the at least one HID ballast or the at least one driver when the optical sensor indicates a condition requiring artificial lighting is not present. In some versions of those embodiments the optical sensor is an ambient light sensor. In some versions of those embodiments the optical sensor is a motion sensor.

In some embodiments electrical power is only provided over the AC power line when a condition requiring artificial lighting is present.

Generally, in another aspect a lighting control system includes a plurality of luminaires powerable and controllable by a common AC power source. Each of the luminaires has at least one selectively powerable first light source having associated first electronics for powering the first light source and at least one selectively powerable second light source having associated second electronics for powering the second light source. The power consumption of the first light source is at least two times greater than the power consumption of the second light source. A signal receiving controller is electrically connected to the first electronics and the second electronics. The signal receiving controller has a power source input selectively electrically connected to the AC power source. Each signal receiving controller selectively routes the power source input to either the first electronics or the second electronics. A lighting controller is electrically coupled to the AC power source remote from the plurality of luminaires. The lighting controller is configured to pulsingly remove and restore the connection between the AC power source and the power source input of the signal receiving controller of a plurality of the luminaires at least twice, thereby causing a control pulse signal to be generated at the power source input of the signal receiving controller of a plurality of the luminaires. The signal receiving controller of each of the luminaires is configured to recognize the control pulse signal at the AC power source input and after recognition of the control pulse signal to cause an alternate of the first electronics and the second electronics to be routed with the AC power source input.

Optionally, a transformer may be electrically interposed between the AC power source and the signal receiving controller. Also, optionally at least one relay may be electrically interposed between the signal receiving controller and at least one of the first light source and said second light source.

In some embodiments the first light source of each of the luminaires is enclosed in a first light source housing and the second light source of each of the luminaires is provided external to the first light source housing. In some versions of those embodiments the first light source is routed with the AC power source input during user selected peak hours and the second light source is routed with power during the non-peak hours.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

As used herein for purposes of the present disclosure, the term "HID lamp" should be understood to include, but not be limited to, any non-LED based lamp that has performance characteristics similar to the group of lamps known as mercury, metal halide, and high pressure sodium. The tem HID lamp specifically includes, but is not limited to, inductive discharge lamps that operate using the principal of induction.

BRIEF DESCRIPTION OF THE ILLUSTRATIONS

In the drawings, like reference characters generally refer to the same parts throughout the different views. Also, the drawings are not necessarily to scale, emphasis instead generally being placed upon illustrating the principles of the invention.

DETAILED DESCRIPTION

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

Figure 1:
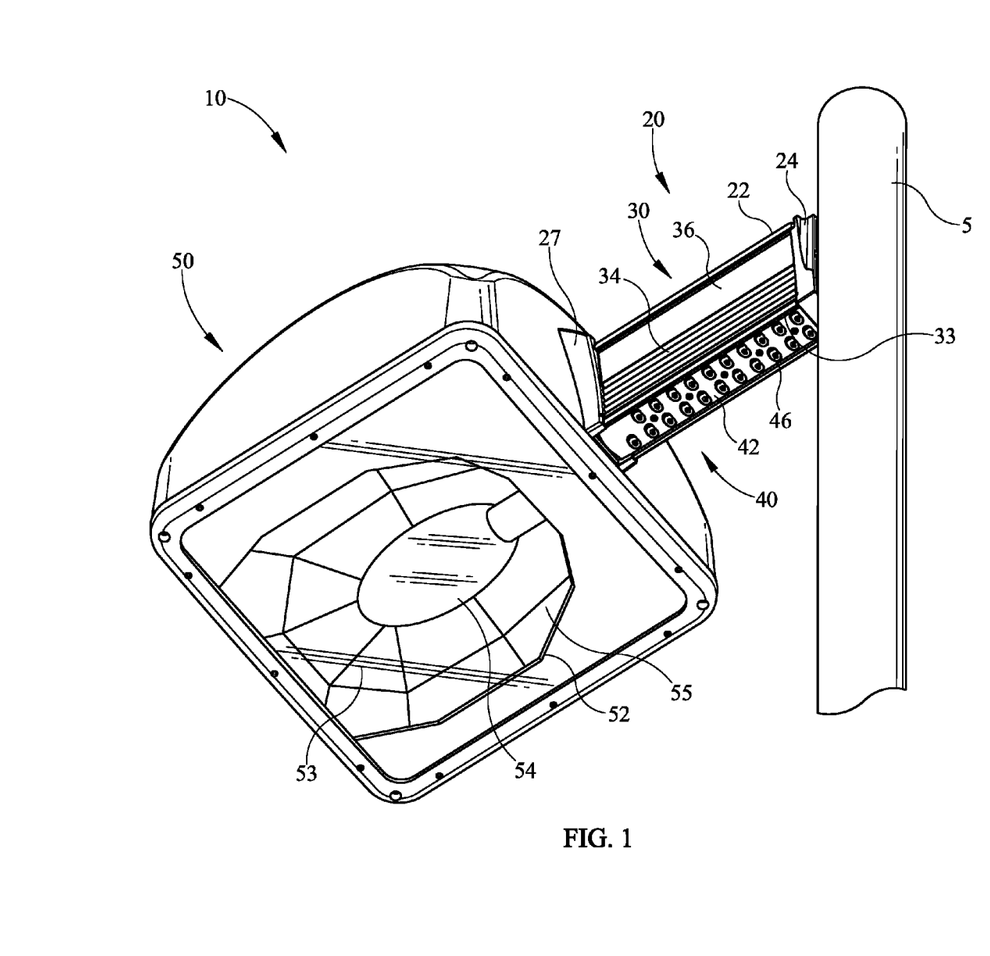
FIG. 1 illustrates a bottom perspective view of a first embodiment of a luminaire having a HID light source and an LED light source.
Figure 2:
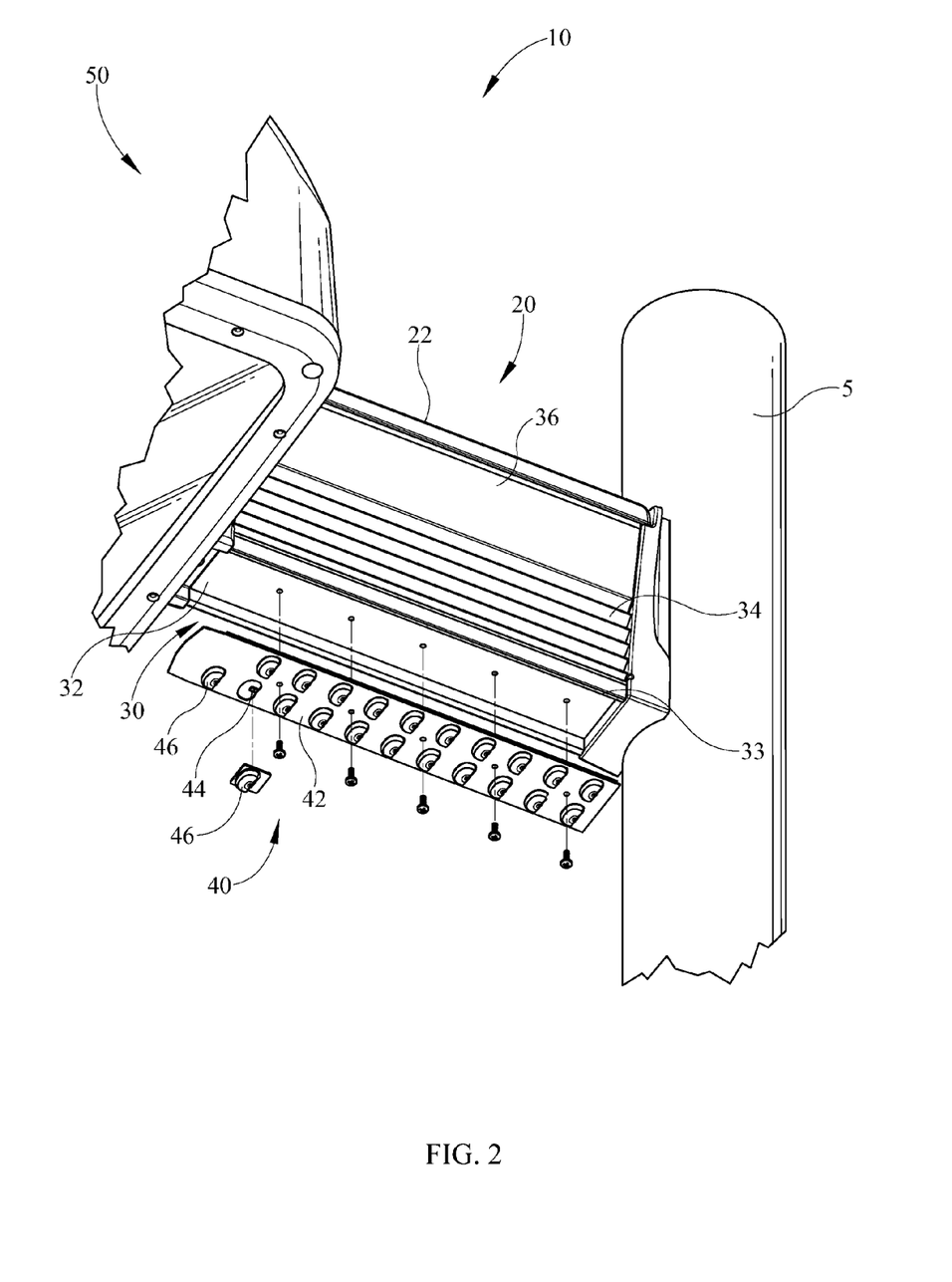
FIG. 2 illustrates a close up bottom perspective view of a LED arm assembly of the first embodiment with a printed circuit board exploded away and a single LED lens exploded away.
Figure 3:
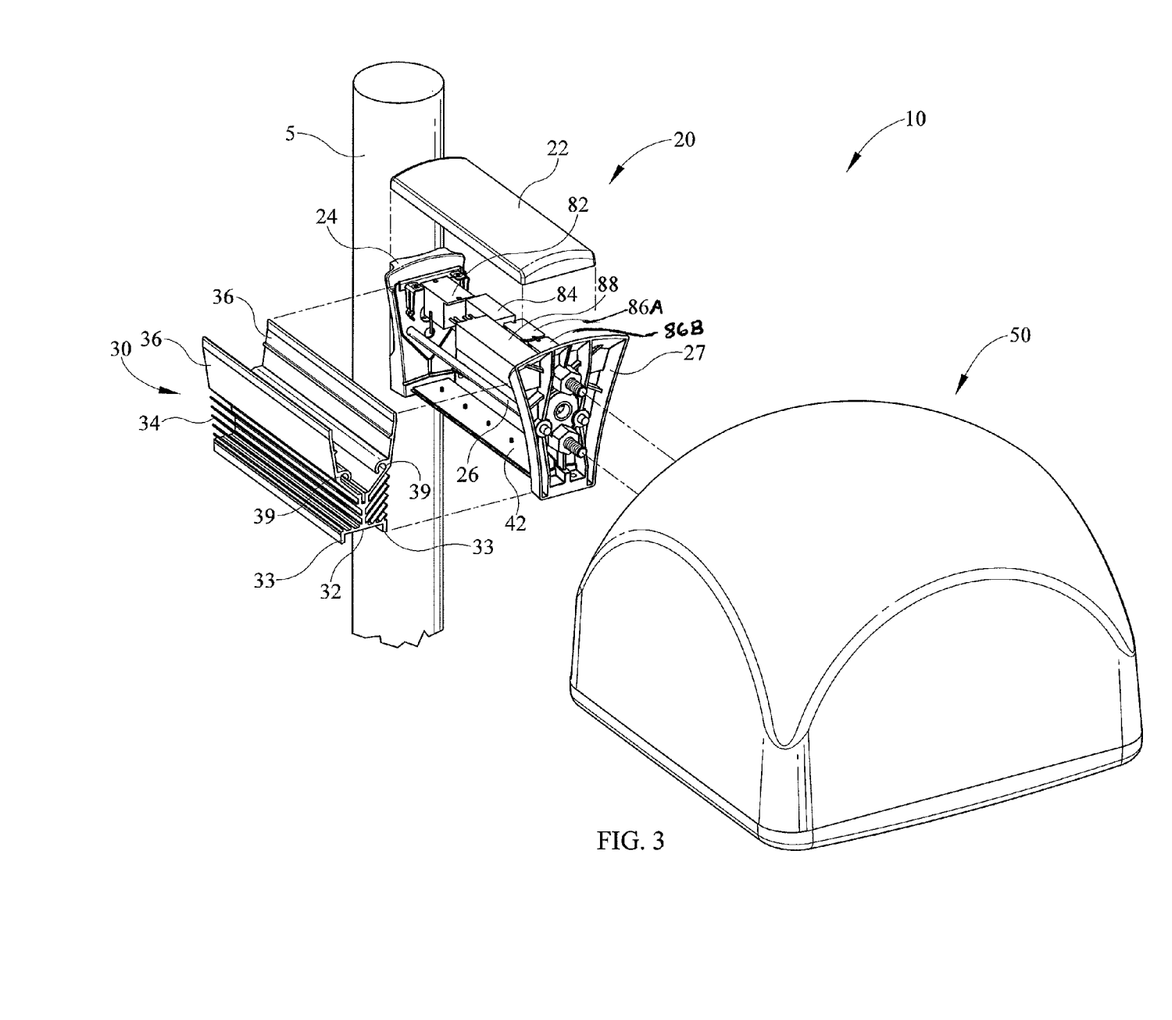
FIG. 3 illustrates an exploded top perspective view of the first embodiment of the luminaire.

Referring to FIGS. 1 through 5, wherein like numerals refer to like parts, two embodiments of a luminaire having a HID light source and a LED light source are depicted. Referring initially to FIG. 1 through FIG. 3, a first embodiment of a luminaire 10 having a HID light source and a LED light source is depicted. The luminaire 10 comprises a LED arm assembly 20 coupled to and extending from a support pole 5. The LED arm assembly 20 has a secondary LED light source 40 thereon that selectively produces a secondary LED light output. A primary HID light source housing 50 is coupled to the LED arm assembly 20 and has an HID lamp 54 therein that selectively produces a primary HID light output. In alternative embodiments the LED arm assembly 20 and/or the LED light source 40 may be coupled to alternative support structures than support pole 5. For example, in some embodiments the LED arm assembly 20 and/or the LED light source 40 may be coupled to a wall of a building or a support pole having a different configuration than support pole 5.

The primary HID light source housing 50 has a lens 53 lying across an opening of the housing. The lens 53 has an opaque portion surrounding a transparent portion and defining a light exit opening 52. In alternative configurations, alternative lens or lenses may be used, such as, for example, lens that are completely transparent, partially or completely diffuse, and/or non-planar. The HID lamp 54 is enclosed within the primary HID light source housing 50 and is surrounded by an HID reflector 55. The light output from the HID lamp 54 is directed out light exit opening 52 downwardly toward a desired illumination area. In some embodiments the HID lamp 54 may be electrically connected to a HID ballast 89 (FIG. 6) enclosed within the HID light source housing 50.

In some embodiments the HID lamp 54 may be a 400 Watt PSMH lamp, consume approximately 462 watts of power, and provide approximately 20,000-30,000 mean lumens of light output. In other embodiments the HID lamp 54 may consume a different amount of Watts and/or output a different amount of Lumens. In alternative embodiments HID lamp 54 may be one or more MH or HPS lamps and may be of a different wattage such as, for example, 150, 320, and/or 350 Watts In some embodiments the HID ballast 89 may be a magnetic ballast configured to power a 400 Watt PSMH lamp. In some embodiments HID light source housing 50 and associated components may at least partially comprise a Philips AL3, AL3R, or EAL19 fixture. A front attachment piece 27 on LED arm assembly 20 attaches HID light source housing 50 to LED arm assembly 20. As understood in the art, HID light source housing 50 may be configured to provide a desired photometric distribution such as, for example, an IES Type III or Type V distribution.

The LED arm assembly 20 has a rear attachment piece 24 that attaches to support pole 5. The LED light source 30 of the LED arm assembly 20 has a printed circuit board 42 comprising a majority of the bottom surface of the LED arm assembly 20 and extending from adjacent the pole 5 to adjacent the primary light source housing 50. In some embodiments the printed circuit board 42 may be an aluminum printed circuit board and in other embodiments the printed circuit board 42 may be an alternative printed circuit board such as, for example, a FR4 printed circuit board. The printed circuit board 42 supports LEDs 44. In the depicted embodiment the LEDs 44 are twenty-one Lumiled Rebel LEDs. In alternative embodiments alternative LEDs 44 may be used. For example, one or more LEDs may be used that have alternative characteristics from the Lumiled Rebel LEDs depicted such as, for example, alternative lumen output, light distribution, color temperature and/or heat generating characteristics. An individual of a plurality of LED lenses 46 may be placed over each of the LEDs 44 and direct light output thereof. A single LED lens 46 is shown exploded away form the LED circuit board 142 in FIG. 2 and a single LED lens 46 is shown in more detail in FIG. 5. Each depicted LED lens 46 is configured for the Lumiled Rebel LEDs to effectively disperse light emitted thereby to a predetermined desired photometric distribution. In other embodiments one or more LEDs may be provided without a lens and/or one or more LEDs may be provided with a lens having an alternative configuration. In some embodiments the LED light source 40 may consume approximately 20 to 35 Watts of power and may provide approximately 1500 to 3000 lumens of light output. In other embodiments the LED light source 40 may consume a different amount of Watts and/or output a different amount of Lumens.

The printed circuit board 42 is attached to and in thermal connectivity with a contact surface 32 of a longitudinally extending heatsink 30 of the LED arm assembly 20. Thermal material may optionally be provided between the printed circuit board 42 and the contact surface 32. In some embodiments the heatsink 30 may be an extruded aluminum heatsink 30. The contact surface 32 is flanked by longitudinally extending lips 33 that also flank the printed circuit board 42. The heatsink 30 has a plurality of longitudinally extending heat fins 32 on each longitudinal side thereof that are oriented at a non-perpendicular and non-parallel angle with respect to the printed circuit board 42. In the depicted embodiment the heat fins 32 are at approximately a forty-five degree upward angle with respect to the printed circuit board 42. The heatsink 30 has longitudinally extending sidewalls 36 disposed vertically above the heat fins 34. The heatsink 30 extends from the rear attachment piece 24 of the LED arm assembly 20 to proximal the front attachment piece 27. A pair of support rods 26 extends from the rear attachment piece 24 to the front attachment piece 27 and may be slidably received in corresponding pathways 39 of the heatsink 30 to support the heatsink 30.

A top cover 22 may be placed atop the heatsink 30. The top cover 22, the heatsink 30, the rear attachment piece 24, and the front attachment piece 27 surround and enclose a transformer 82, a signal receiver controller 84, a normally closed relay switch 86A, a normally open relay switch 86B, and an LED driver 88. The transformer 82 steps down the voltage of the external power supply and converts it to a DC voltage. For example, the transformer 82 may step down a 120V or 277V AC external power supply voltage and convert it to a 12V or 24V DC voltage. The DC voltage output of the transformer 82 is in electrical connectivity with the signal receiver controller 84. Thus, signal receiving controller 84 is in indirect electrical connection with the external power supply. The signal receiver controller 84 has a control output that is in electrical connectivity with a control input of the normally closed relay switch 86A and a control input of the normally open relay switch 86B. The normally closed relay switch 86A also has a relay power terminal in electrical connectivity with the external power supply and a normally closed control output in electrical connectivity with the HID ballast 89. The normally open relay switch 86B also has a relay power terminal in electrical connectivity with the external power supply and a normally open control output in electrical connectivity with the LED driver 88. The LED driver 88 is in electrical connectivity with the printed circuit board 42 and the LEDs 44.

The signal receiver controller 84 selectively provides a voltage over the control output to the control input of normally closed relay switch 86A and the control input of normally open relay switch 86B. When the voltage over the control output of the signal receiver controller 84 is above a threshold voltage, the normally closed relay switch 86A is opened and the normally open relay switch 86B is closed. Accordingly, when the voltage over the control output of the signal receiver controller 84 is above a threshold voltage the normally open relay switch 86B routes the external power supply with the LED driver 88, thereby causing the LED driver 88 (and the LEDs 44) to be powered. The normally closed relay switch 86A is open and therefore does not route the external power supply to the HID ballast 89. Conversely, when the voltage over the control output of the signal receiver controller 84 is below a threshold voltage (for example, when the voltage is zero), the normally closed relay switch 86A is closed and the normally open relay switch 86B is open. Accordingly, when the voltage over the control output of the signal receiver controller 84 is below a threshold voltage the normally closed relay switch 86A routes the external power supply with the HID ballast 89, thereby causing the HID ballast 89 (and the HID lamp 54) to be powered. The normally open relay switch 86B is open and therefore does not route the external power supply to the LED driver 88.

In some embodiments the signal receiver controller 84 may receive a control signal that determines whether the signal receiver controller 84 outputs a control output voltage that is above or below a threshold voltage and, as a result, determines whether the HID lamp 54 or the LEDs 44 are powered. In some embodiments the control signal may be received via the transformer 82. For example, the control signal may be sent across an alternating current mains power line that is in electrical communication with the transformer 82. In some embodiments the external power supply that feeds the transformer 82 may be in electrical communication with a lighting controller and/or a user actuable switch. For example, in some embodiments the external power supply that feeds the transformer 82 may be in electrical communication with a lighting controller that sends a control signal over the external power supply at desired times. In some embodiments the external power supply that feeds the transformer 82 may additionally or alternatively be in electrical communication with a user actuable switch that sends a control signal over the external power supply when it is actuated by a user. In some embodiments the lighting controller and/or the user actuable switch may be located remotely from luminaire 10 and may be in electrical communication with an external power supply that feeds multiple transformers 82 of multiple luminaires 10. In some embodiments the LED driver 88 may be a Light Tech Inc. driver Model # LED-25-8V/12V/24V DCP. In some embodiments the transformer 82, the relays 86A and/or 86B, and/or the LED drivers 88 may be in contact with and/or in thermal connectivity with one of the sidewalls 36 of heatsink 30.

Although the transformer 82, the signal receiver controller 84, the relays 86A and 86B, the LED driver 88, the HID ballast 89, and the electrical connections therebetween are depicted and described in detail herein, other embodiments may implement other configurations. For example, in some embodiments multiple LED driver 88 may be provided. Also, for example, in some embodiments the transformer 82 may be integrated into the signal receiver controller 84. Also, for example, in some embodiments the transformer 82 may be omitted and the signal receiver controller 84 may be configured to accept power directly from the external power supply. Also, for example, in some embodiments a transformer may be interposed between the HID ballast 89 and/or the LED driver 88 may be configured to receive DC voltage which may be provided via transformer 82 or a separate transformer. Also, for example, in some embodiments one, multiple, or all of the transformer 82, the signal receiver controller 84, and the LED driver 88 may be located external to the LED arm assembly 20, such as, for example, in primary HID light source housing 50, and/or in support pole 5. Also, for example, in some embodiments the HID ballast 89 may be provided in the LED arm assembly 20. Also, for example, in some embodiments the relays 86A and 86B may be combined into a single package. Also, for example, in some embodiments, multiple electrical connections between the signal receiver controller 84 and the relays 86A and 86B may be present. For example, in some embodiments each of the relays 86A and 86B may have an independent electrical coupling to the signal receiver controller 84. In those embodiments and in other embodiments the relays 86A and 86B may optionally both be normally closed or normally opened relays. In some embodiments the relays 86A and 86B may be a Crydom D2425D Dual Solid State Relay.

In some embodiments only the HID lamp 54 may be activated during peak hours to provide an IES compliant level of illumination to an illumination area and only the LED light source 40 may be activated during off-peak hours to provide a level of illumination of a lower luminosity than that provided by the HID lamp 54. In some embodiments peak hours may include a time period proximal to dusk until a predetermined time when pedestrian and/or vehicular traffic in an illumination area is anticipated to be minimal and a time period when pedestrian and/or vehicular traffic in an illumination area is anticipated to be more than minimal until a time period proximal to dawn. In some embodiments peak hours may include time periods when pedestrian and/or vehicular traffic in an illumination area is anticipated to be more than minimal and the ambient light level is less than a predetermined threshold ambient light level. In some embodiments off-peak hours may include one or more time periods between proximal to dusk and proximal to dawn when pedestrian and/or vehicular traffic to an illumination area is anticipated to be minimal. In some embodiments off-peak hours may include one or more time periods when pedestrian and/or vehicular traffic to an illumination area is anticipated to be minimal and the ambient light level is less than a predetermined threshold ambient light level.

Figure 4:
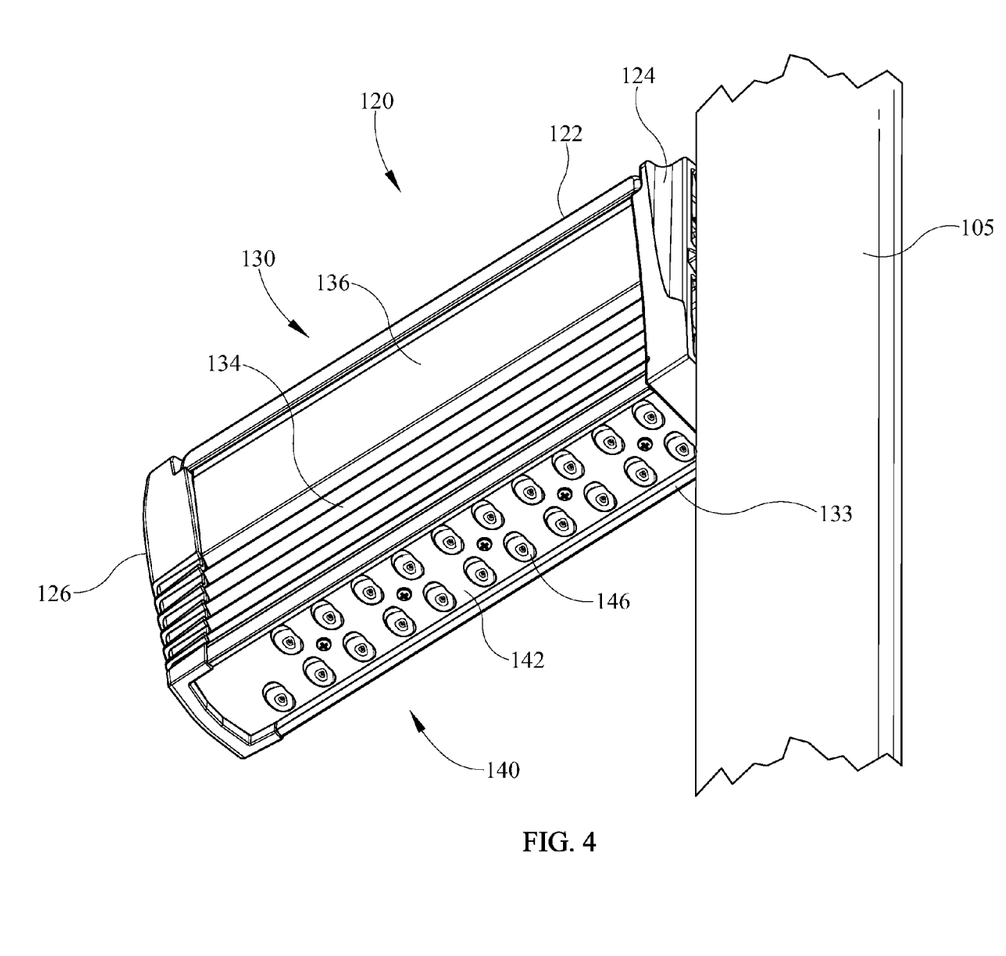
FIG. 4 illustrates a close up view of an LED arm assembly of a second embodiment of a luminaire having a HID light source and an LED light source
Figure 5:
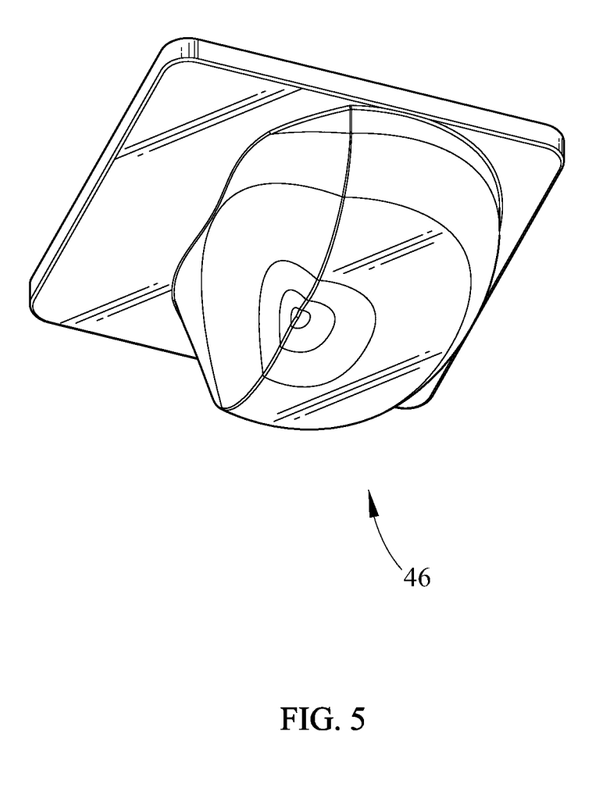
FIG. 5 illustrates a bottom perspective view of a single LED lens of the first embodiment of the luminaire.

Referring now to FIG. 4 a second embodiment of a luminaire 100 having a HID light source and a LED light source is depicted. With reference to FIG. 4, the luminaire 100 has a LED arm assembly 120 extending from a vertically extending support pole 105. Located vertically above the LED arm assembly 120 is a primary HID light source housing coupled to the vertically extending support pole 105 and having an HID lamp therein that selectively produces a primary HID light output. Although the primary HID light source housing is not shown in FIG. 4, it is a HID light source housing like HID light source housing 50 of the first embodiment and is coupled to the support pole 105 using a structure other than the LED arm assembly 20.

In alternative embodiments the primary HID light source housing may be any number of housings that encloses an HID lamp and may be alternatively incorporated into the luminaire. For example, in some embodiments of luminaire 100 the HID light source housing may be like HID light source housing 50 of the first embodiment and may be coupled to the support pole 105 using the LED arm assembly 20 of the first embodiment. In other embodiments of luminaire 100, for example, the HID light source housing may be like HID light source housing 50 of the first embodiment and may be directly coupled to the support pole 5, or may be coupled to the support pole 5 using support structure other than the LED arm assembly 20. In other embodiments the HID light source housing may be a cobra head housing. In alternative embodiments the HID light source housing may be located vertically at the same level as the LED arm assembly 120 or below the LED arm assembly 120. In other embodiments multiple HID light source housings may be provided and/or multiple LED arm assemblies 120 may be provided about a single support pole 105.

The LED arm assembly 120 is similar to the LED arm assembly 20 of the first embodiment. However, the LED arm assembly 120 does not support a HID light source housing and has a front decorative endcap piece 126 in lieu of front attachment piece 27. In some applications the LED arm assembly 120 may be used in a retrofit situation and coupled to a pole or other support structure proximal a preexisting HID light source housing. The LED arm assembly 120 has an LED light source 140 having a printed circuit board 142 supporting a plurality of LEDs each having a corresponding optical lens 146 thereover. The LED light source 140 is thermally connected to a longitudinally extending heatsink 130 having longitudinally extending lips 133 flanking the printed circuit board 142 and angled heat fins 134 and sidewalls 136 positioned upwardly of the printed circuit board 142. A cap 122 helps enclose electronics within the LED arm assembly 120 and a rear attachment piece 124 attaches the LED arm assembly 120 to the support pole 105.

In some embodiments the LED arm assembly 120 may enclose a signal receiver controller, a transformer, a HID ballast, and/or a LED driver. Any signal receiving controller internal to LED arm assembly 120 may be in direct or indirect electrical communication with the ballast powering the HID lamp in the HID light source housing of luminaire 100. The ballast powering the HID lamp may be located in the LED arm assembly 120 in some embodiments and may be located remote from the LED arm assembly 120 in other embodiments. Any signal receiving controller internal to LED arm assembly 120 may also be in direct or indirect electrical communication with the LED driver(s) powering the LED light source 140. Any signal receiving controller internal to LED arm assembly 120 may be configured to selectively cause either the LED light source 140 or the HID light source of the luminaire 100 to be powered. Any signal receiving controller internal to LED arm assembly 120 may selectively cause either the LED light source 140 or the HID light source of the luminaire 100 to be powered based on a signal sent from a location remote from the luminaire 100.

In some embodiments a plurality of luminaires 10 and/or 100 may form part of a lighting network and be powered by their connection to an external AC power supply and also controlled through their connection to the same external AC power supply. Each transformer 82 of the luminaires 10 and/or 100 may have an AC power supply input electrically connected to the AC power supply and a DC output electrically connected to the signal receiving controller 84. The signal receiving controller 84 may provide either an above a threshold control output voltage or a below a threshold control output voltage to relays 86A and 86B dependent on a control signal received via the DC output from the transformer 82. Accordingly, the AC power supply will be routed to either the HID ballast 89 or the LED driver 88 dependent on a control signal received via the DC output from the transformer 82. In some embodiments a lighting controller may be in electrical communication with the AC power supply at a location remote from the plurality of luminaires 10 and/or 100. The lighting controller may be configured to cause the AC power supply to be pulsingly reduced below a threshold value and restored to at least a threshold value at a predetermined time, thereby causing a control signal to be generated. In some embodiments the AC power supply may be pulsingly removed and restored from the luminaires 10 and/or 100 at a predetermined time, thereby causing a control signal to be generated. Each signal receiving controller 84 of the luminaires 10 and/or 100 may receive the control signal via transformer 82, recognize the control signal, then either provide at least a threshold voltage to relays 86A and 86B or a below a threshold voltage to relays 86A and 86B, thereby causing either HID ballast 89 or LED driver 88 to be routed with the AC power supply input. In some embodiments the signal receiving controller 84 may alternate which of at least a threshold voltage and below a threshold voltage it supplies to relays 86A and 86B. For example, if the signal receiving controller 84 most recently supplied at least a threshold voltage to relays 86A and 86B it may, upon receiving a control signal, supply a below a threshold voltage to relays 86A and 86B. In other embodiments the signal receiving controller 84 may supply at least a threshold voltage to relays 86A and 86B when a first control signal is received and may supply a below a threshold voltage to relays 86A and 86B when a second distinct control signal is received.

Optionally, the control signal may be a dual pulse signal, whereby the AC power supplied to the transformer 82 (and the DC power being supplied to the signal receiving controller 84 via transformer 82) is reduced below a threshold value for a first removal period, then restored to at least a threshold value for a first restoral period, then reduced below a threshold value for a second removal period, and then restored to at least a threshold value until a next dual pulse signal is sent. Optionally, one or more override switches may be provided that are in electrical communication with the lighting controller and that may be actuated as desired to cause the lighting controller to cause the AC power supply to be pulsingly removed and restored.

Figure 6:
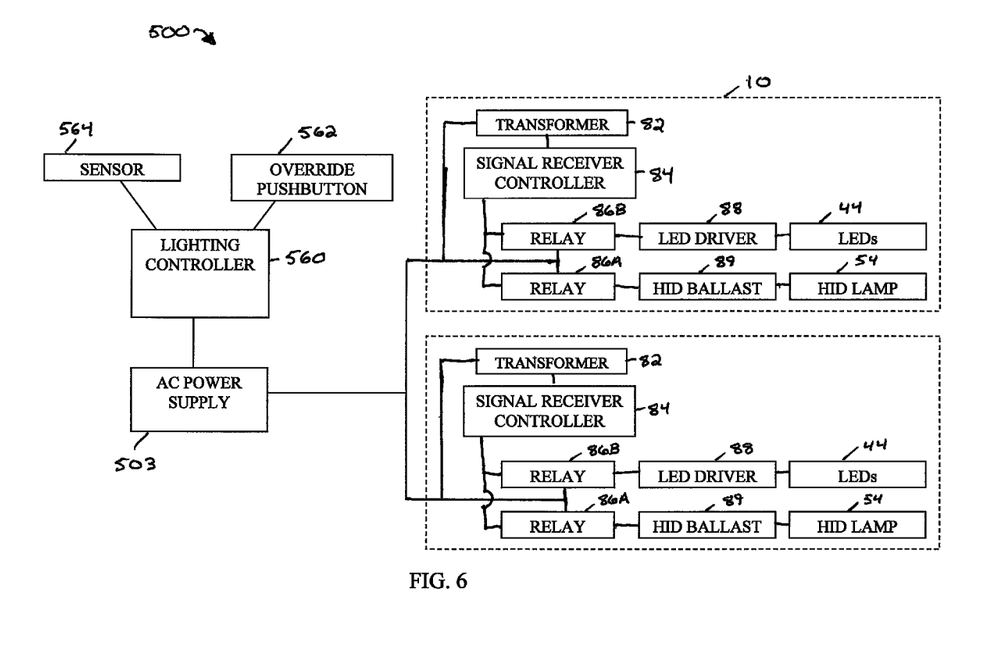
FIG. 6 illustrates an embodiment of a lighting network.

With reference to FIG. 6 an embodiment of a lighting network 500 is depicted. The lighting network 500 includes a lighting controller 560 that is in electrical communication with an AC power supply 503. In some embodiments the AC power supply 503 may be mains power such as, for example, mains 120V AC power. The AC power supply 503 may be a single circuit or may include multiple circuits. In some embodiments the lighting controller 560 is in electrical communication with the AC power supply 503 via a contactor panel which routes the AC power supply 503 therethrough. For example, the lighting controller 560 may be in electrical communication with one or more switches of the contactor panel that each control the flow of the AC power supply 503 to one or more luminaires 10 and/or 100. The lighting controller 560 is in electrical communication with the transformer 82 of each of a plurality of luminaires 10 via electrical communication with the AC power supply 503. In some embodiments the lighting controller 560 may additionally or alternatively be in communication with alternative luminaires, such as, for example, one or more luminaires 100. The lighting controller 560 may be located remote from the plurality of luminaires 10 in some embodiments. For example, the luminaires 10 may be located in a parking lot and the lighting controller 560 may be located in an electrical room of an adjacent building. The lighting controller 560 may be configured for connection to AC power supply 503 in series or parallel therewith.

The lighting controller 560 is configured to cause a control pulse signal to be generated via the AC power supply 503 that feeds a plurality of luminaires 10. In some embodiments the control pulse signal may be generated by the lighting controller 560 causing the AC power supply 503 to be pulsingly removed and restored from the luminaires 10. The signal receiver controller 84 of each luminaire 10 may be configured to recognize the control pulse signal (via its connection with transformer 82) and after recognition of the control pulse signal, cause an alternate of either the HID ballast 89 or the LED driver 88 to be routed with any power that may be supplied by AC power source 503. The signal receiving controller 84 may provide an alternative of an above a threshold control output voltage or a below a threshold control output voltage to relays 86A and 86B when the control signal is received via the DC output from the transformer 82. Accordingly, any power that may be supplied by AC power source 503 will be routed to either the HID ballast 89 or the LED driver 88.

The lighting controller 560 may be configured to only allow AC power supply 503 to be provided to luminaires 10 at time periods when artificial lighting may be desired. For example, in some embodiments the lighting controller 560 may be coupled to a sensor 564 and may allow power to one or more luminaire 10 when readings from sensor 564 indicate that artificial lighting is desired. For example, in some embodiments the sensor 564 may include one or more photo sensors that measure ambient light levels. In other embodiments, for example, the sensor 564 may additionally or alternatively include one or more motion sensors that may detect when vehicular or pedestrian traffic is present and artificial lighting may be desired. In other embodiments lighting controller 560 may allow power to be supplied to luminaires 10 during one or more predetermined time periods each day. In some embodiments the lighting controller 560 may allow power to be supplied to luminaires 10 at all times during each day. Signal receiving controller 84 of one or more luminaires 10 may in those or other embodiments be optionally paired with a separate time clock or with a sensor and allow power to be supplied to either HID ballast 89 or LED driver 88 only when readings from the lighting controller 560 and the sensor of the luminaires 10 indicate artificial lighting is desired. For example, the signal receiving controller 84 may be in electrical communication with an additional relay interposed between the AC power supply 503 and relays 86A and 86B and only allow the relay to be closed when artificial lighting is desired. In other embodiments other devices and/or methods may be used to only allow HID lamp 54 or LED light source 40 to be illuminated at desired periods throughout the day.

Optionally, one or more override pushbuttons 562 may be provided in electrical communication with the lighting controller 560 and may be actuated by a user as desired to cause a control pulse signal to be generated, thereby causing each signal receiving controller 84 to cause an alternative of either the HID ballast 84 or the LED drivers 86 to be routed with any power that may be supplied to relays 86A and 86B via AC power source 503. For example, a plurality of luminaire 10 may be provided in a parking lot of a store. Lighting controller 560 may be configured to cause a control pulse signal to be generated each night one hour after the store closes that causes the LED light source 40 to be routed with power and the HID lamp 54 to be extinguished. If the store were to stay open later than normal one night and a user did not want to reprogram the lighting controller 560, the user could simply actuate the override pushbutton 562 after the LED light source 40 is routed with power to cause the signal receiver controller 84 to cause power to be routed to the HID lamp 54. Alternatively, or additionally, the override pushbutton 562 may be configured to prevent the lighting controller 560 from causing a pulse signal to be generated when the override pushbutton 562 is in the on or activated position. Thus, using the preceding example, a user could place the override pushbutton 562 in the on or activated position prior to the time when the control pulse signal is typically generated and prevent power from being rerouted from the HID lamp 54 to the LED light source 40. The override pushbutton 562 could then be moved to the off or non-activated position after the HID light source 54 is no longer needed and the lighting controller 560 may then, or after a period of delay, cause the control pulse signal to be generated. In some embodiments the override pushbutton 562 may be an Allied Electronics ABW411-R.

Figure 7:
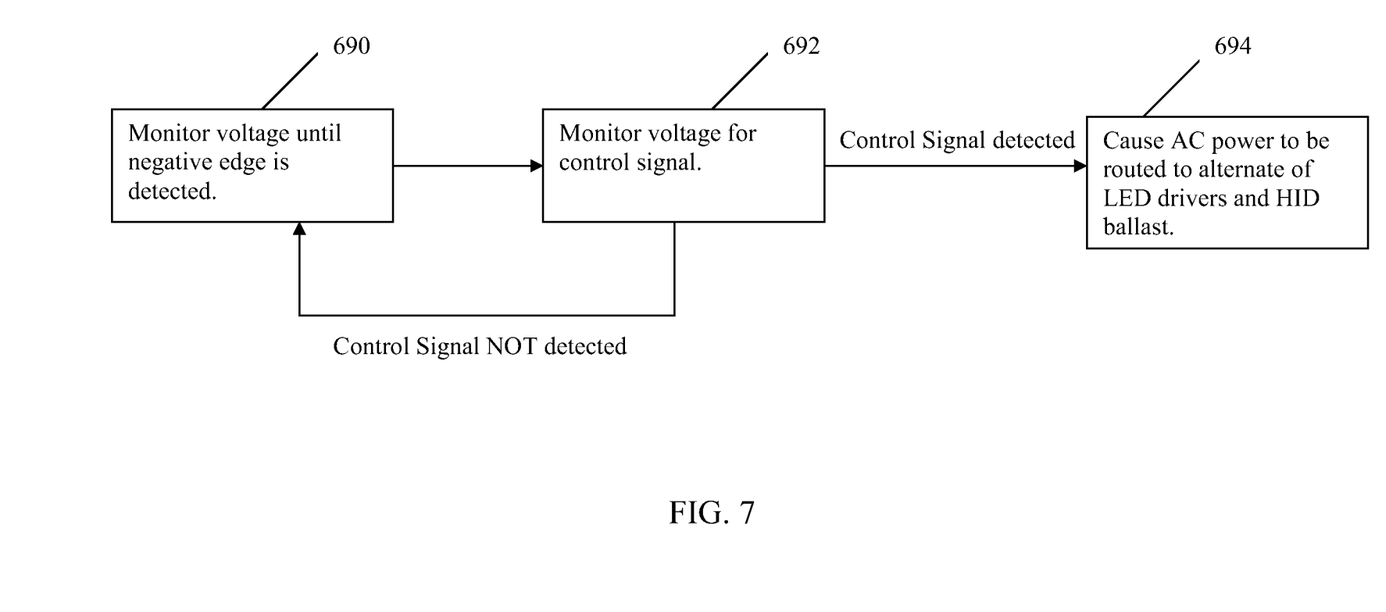
FIG. 7 illustrates a schematic diagram of an embodiment of a method of monitoring for a control signal and alternating between a first light source and a second light source.

Referring now to FIG. 7, a schematic diagram of an embodiment of a method of monitoring for a control signal and alternating between a first light source and a second light source when a control signal is received is provided. The method may be implemented into hardware and/or software of signal receiver controller 84 of each luminaire 10. At step 690 a voltage input is monitored until a negative edge is detected. The voltage input may be the DC voltage input from transformer 82. A negative edge is detected when the DC voltage decreases by at least a threshold amount (which corresponds to the root mean square value of the AC voltage being supplied to transformer 82 decreasing by a certain amount). If a negative edge is detected, then at step 692 the voltage input is monitored for a predetermined period of time to determine if a control signal is present at the voltage input. If a control signal is not present at the voltage input then the voltage is monitored again until a negative edge is detected at step 690. If a control signal is present at the voltage input then at step 694 the AC power source will be routed from a most recently powered light source to a less recently powered light source of a luminaire having two light sources. The AC power source may be routed from a most recently powered light source to a less recently powered light source by altering the state of the control output that feeds relays 86A and 86B. After the AC power source has been rerouted, then the voltage is monitored again until a negative edge is detected at step 690.

Figure 8:
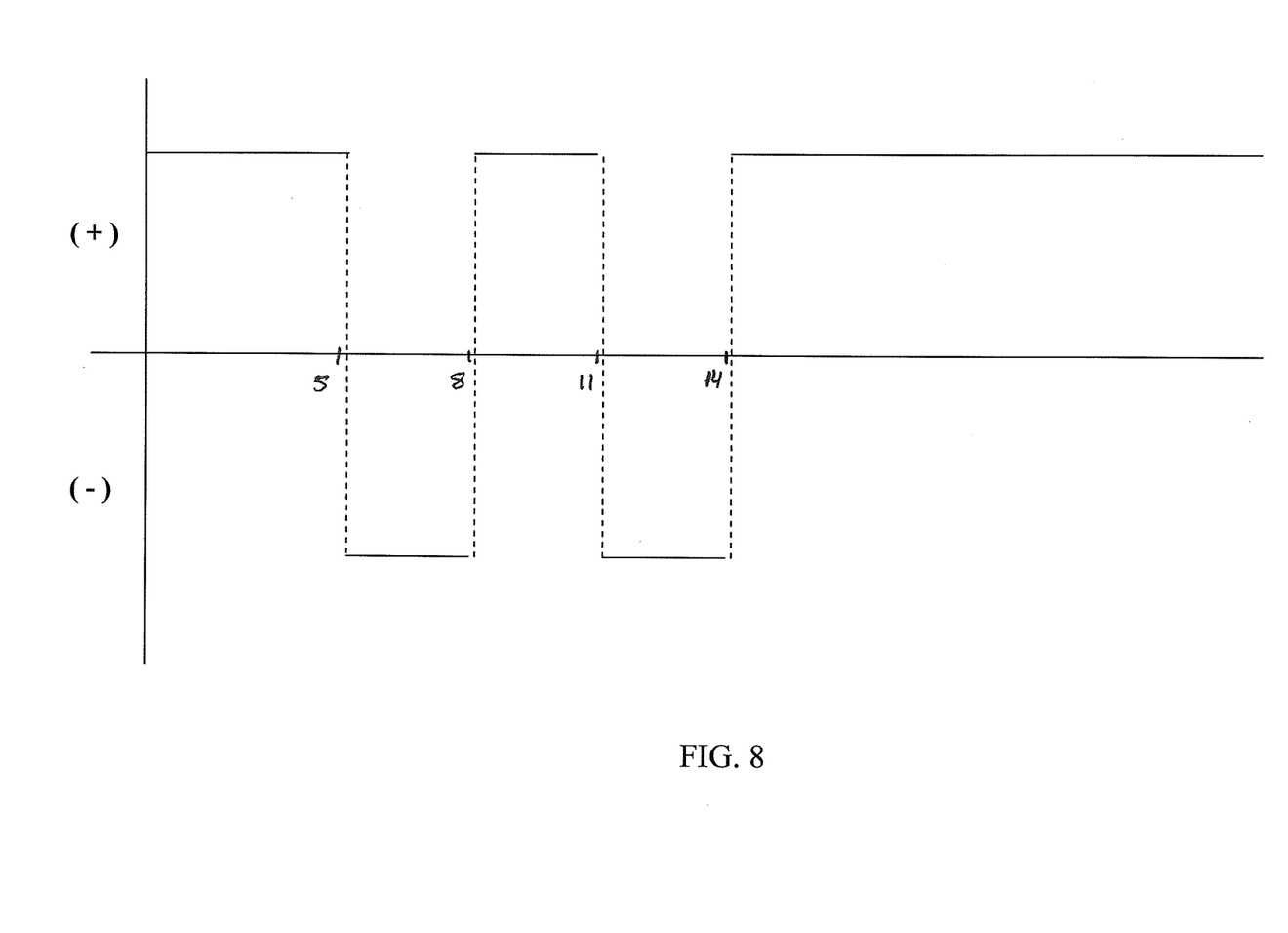
FIG. 8 illustrates an embodiment of a control signal.

Referring now to FIG. 8, an embodiment of a control signal is graphically depicted. The control signal of FIG. 8 is a dual pulse control signal and may be caused by lighting controller 560 causing the AC voltage supplied to luminaires 10 to be pulsingly altered, for example, pulsingly removed and restored. The control signal may be received at an AC voltage input of transformer 82 and correspondingly outputted via a DC voltage output of transformer 82. The horizontal axis in FIG. 8 represents time in seconds and the vertical axis in FIG. 8 represents AC voltage. A positive reading on the vertical axis indicates that the root mean square (RMS) of the AC voltage is at or above a threshold RMS voltage and a negative reading on the vertical axis indicates that the RMS of the AC voltage is below a threshold amount. At the time five seconds into this graphical depiction, the RMS of the AC voltage moves from at or above a threshold amount to below a threshold amount. The RMS voltage stays below the threshold for three seconds until a time eight seconds into the graphical depiction, where the RMS voltage moves at or above the threshold amount for three seconds until a time approximately eleven seconds into the graphical depiction. The RMS voltage then moves below the threshold for three seconds until a time fourteen seconds into the graphical depiction, where the RMS voltage moves at or above the threshold amount, where it continues to stay at or above the threshold amount for a predetermined amount of time. The control signal at the DC voltage output of transformer 82 will correspondingly vary between below a threshold DC voltage and at or above a threshold DC voltage.

The signal receiver controller 84 may be configured to monitor for the initial negative edge via transformer 82, then to take a plurality of samples of the voltage output from transformer 82 at predetermined times following the initial negative edge to determine if a control signal is present. For example, the signal receiver controller 84 may be configured to take samples of the voltage output at one, two, four, five, seven, eight, ten, and twelve seconds following the initial negative edge. If the readings at one, two, seven, and eight seconds correspond to a voltage that is less than the threshold voltage amount and the readings at three, four, seven, and eight seconds correspond to a voltage that is at or above a threshold amount, then the signal receiver controller 84 may determine that a control signal is present. In alternative embodiments the signal receiver controller 84 may, for example, take more or less samples, take samples at different frequencies, and/or require that less then all samples correspond to control signal values.

Figure 9:
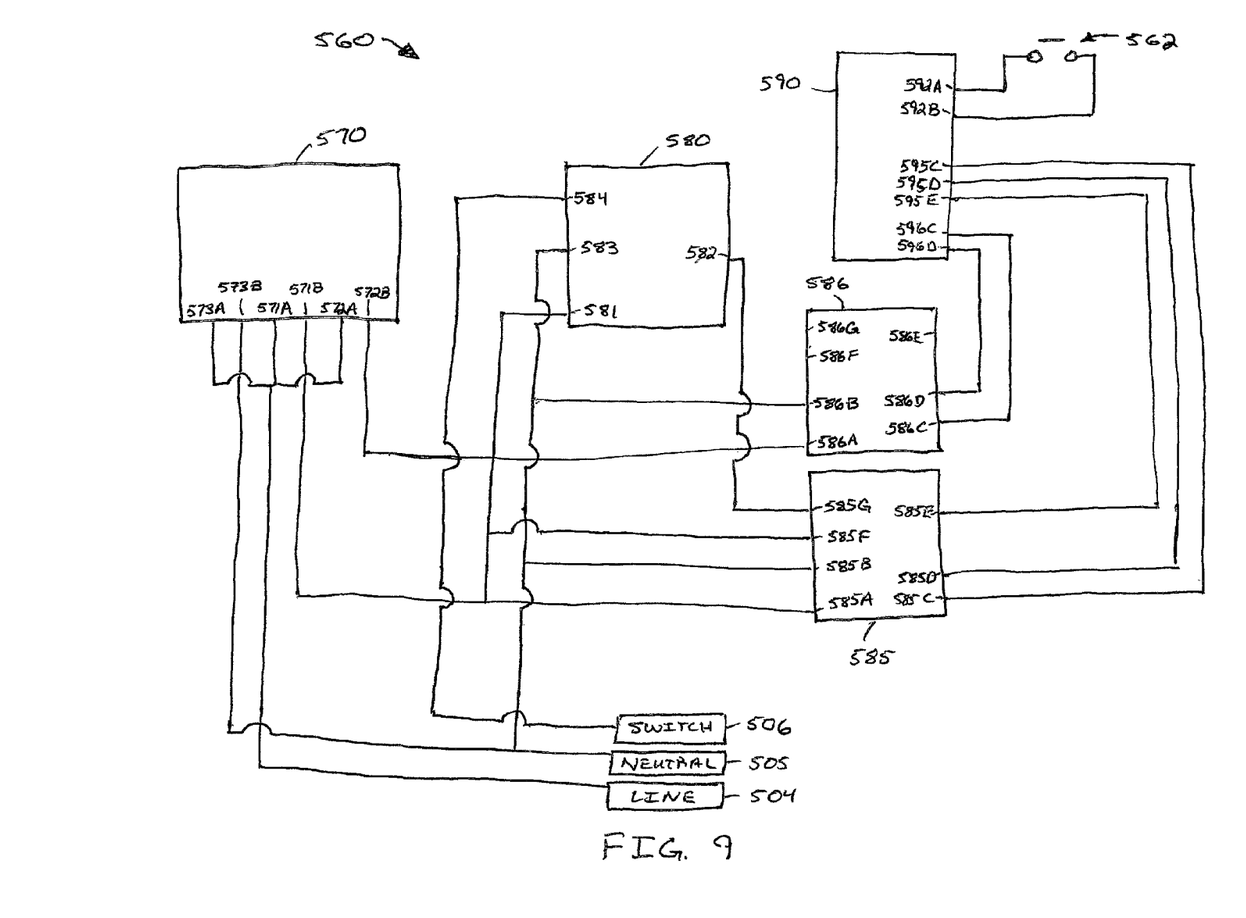
FIG. 9 illustrates schematic diagram of an embodiment of a lighting controller of the lighting network of FIG. 6.

Referring now to FIG. 9, an embodiment of the lighting controller 560 is depicted in schematic format in additional detail. The lighting controller 560 includes a time clock 570, a relay 580, a first power pack 585, a second power pack 586, and a signal generating controller 590. The time clock 570 is a dual channel time clock having a time clock first channel input terminal 571A and a time clock first channel output terminal 571B and a time clock second channel input terminal 572A and a time clock second channel output terminal 572B. The time clock 570 also has a time clock line terminal 573A and a time clock neutral terminal 573B. The time clock line terminal 573A, the time clock first channel input terminal 571A, and the time clock second channel input terminal 572A are electrically coupled to an AC line voltage output 504. The time clock neutral terminal 573B is electrically coupled to an AC neutral voltage output 505. In some embodiments the line voltage output 504 and the neutral voltage output 505 may be routed through a contactor panel which routes an AC power supply therethrough. In some embodiments the time clock 570 may be a Tork EWZ201 digital control.

The relay 580 has a relay power terminal 581, a relay common terminal 582, a relay neutral terminal 583, and a relay normally closed output 584. The relay normally closed output 584 may be electrically coupled to a switch 506 that causes the power to a plurality of luminaires to be applied or removed dependent on the status of the normally closed output 584. For example, in some embodiments the normally closed output 584 may be electrically coupled to a switch of a contactor panel and may cause the contactor panel to apply power to a plurality of luminaires 10 and/or 100 whenever line voltage is present over the normally closed output 584 and remove power from the plurality of luminaires 10 and/or 100 whenever line voltage is not present over the normally closed output 584.

The first power pack 585 has first power pack AC hot terminals 585A and 585F, a first AC power pack neutral terminal 585B, a first power pack DC hot terminal 585C, a first power pack DC common terminal 585D, a first power pack control input terminal 585E, and first power pack AC hot output terminal 585G. The second power pack 586 has second power pack AC hot terminals 586A and 586F, a second AC power pack neutral terminal 586B, a second power pack DC hot terminal 586C, a second power pack DC common terminal 586D, a second power pack control input terminal 586E, and second power pack AC hot output terminal 586G. The first power pack AC hot output terminal 585G is electrically coupled to the relay common terminal 582.

The signal generating controller 590 has a controller first DC hot input terminal 596C, a controller first DC common input terminal 596D, a controller second DC hot input terminal 595C, a controller second DC common input terminal 595D, a controller DC control output terminal 595E, a controller override switch output terminal 592A and a controller override switch input terminal 592B. The override switch 562 is coupled between the controller override switch output terminal 592A and the controller override switch input terminal 592B.

The neutral voltage output 505 is electrically coupled to the first AC power pack neutral terminal 585B, the second AC power pack neutral terminal 586B, and the relay neutral terminal 583. The first power pack AC hot terminals 585A and 585F are electrically coupled to the first channel output terminal 571B. The first power pack DC hot terminal 585C, first power pack DC common terminal 585D, and first power pack control input terminal 585E are electrically coupled to respective of the controller second DC hot input terminal 595C, controller second DC common input terminal 595D, and controller DC control output terminal 595E.

The second power pack AC hot terminal 586A is electrically coupled to the second channel output terminal 572B. The second power pack DC hot terminal 586C is electrically coupled to the controller first DC hot input terminal 596C. The second power pack DC common terminal 586D is electrically coupled to the controller first DC common input terminal 596D.

In operation, a user may configure the time clock 570 so that the time clock first channel input terminal 571A is electrically coupled to the time clock first channel output terminal 571B during preselected times when a user desires power to be supplied to one or more luminaires 10 and/or 100 (e.g., during times of low ambient light and/or during times of high activity). Accordingly, during those times the line voltage output 504 being supplied to the first channel input terminal 571A will be routed to first power pack hot terminal 585A, first power pack hot terminal 585F, and relay power terminal 581. The relay power terminal 581 will be electrically coupled with the relay normally closed output 584 so long as a threshold voltage is not being received at the relay common terminal 582.

The user may configure the time clock 570 so that the time clock second channel input terminal 572A is electrically coupled to the time clock second channel output terminal 572B during preselected times when a user desires a control signal to be generated across the power being supplied to one or more luminaires 10 and/or 100. Accordingly, during those times the line voltage input 504 being supplied to the second channel input terminal 572A will be routed to second power pack hot terminal 586A. Resultantly, second power pack DC hot output terminal 586C will supply a DC voltage to controller second DC hot input terminal 596C. When controller second DC hot input terminal 596C receives a threshold DC voltage, it causes a DC voltage to be pulsingly generated at controller DC control output terminal 595E, which is then received at first power pack control input terminal 585E. Whenever the DC voltage is received at first power pack control input terminal 585E, it causes the line voltage being supplied to first power pack AC hot terminal 585F to be routed with the first power pack AC hot output terminal 585G, which is electrically coupled to the relay common terminal 582. When the line voltage is received at the relay common terminal 582, the relay power terminal 581 is no longer electrically coupled with the relay normally closed output 584, thereby causing power to be removed from one or more luminaires 10 and/or 100. Accordingly, by pulsingly generating a DC voltage at controller DC control output terminal 595E, power to one or more luminaires 10 and/or 100 is pulsingly removed and restored.

The override switch output terminal 592A may output a DC voltage when DC voltage is being supplied thereto via first power pack DC common terminal 585D (when time clock first channel input terminal 571A is electrically coupled to the time clock first channel output terminal 571B). During such a time, when the override switch 562 is actuated by a user, a threshold DC voltage will be received at the controller override switch input terminal 592B. When controller override switch input terminal 592B receives the threshold DC voltage, it causes a DC voltage to be pulsingly generated at controller DC control output terminal 595E which is then received at first power pack control input terminal 585E. Accordingly, by pulsingly generating a DC voltage at controller DC control output terminal 595E, power to one or more luminaires 10 and/or 100 is pulsingly removed and restored.

In some applications the control system 500 may be utilized to retrofit an area having a plurality of preexisting HID luminaires with luminaires having an HID light source and an LED light source, wherein neither the plurality of the preexisting HID luminaires nor the luminaires having an HID light source and an LED light source have any separate control wires running thereto. For example, a plurality of preexisting HID luminaires may be provided installed on mounting poles throughout a parking lot having only an AC power source connection. At least one LED arm assembly 120 may be installed on each pole. A transformer 82, signal receiving controller 84, and/or relays 86A and 86B may be appropriately electrically connected to the electronics driving the LED light source 140 of the LED arm assembly 120, electrically connected to a ballast powering an adjacent HID lamp, and electrically connected to the AC power source connection.

The lighting controller 560 may be installed remote to the luminaires and placed in electrical communication with the AC power source supplying the AC power source connection of each of the luminaires.

The foregoing description has been presented for purposes of illustration. It is not intended to be exhaustive or to limit the invention to the precise forms disclosed, and obviously many modifications and variations are possible in light of the above teaching. It is understood that while certain forms of the invention have been illustrated and described, it is not limited thereto except insofar as such limitations are included in the following claims and allowable functional equivalents thereof.

We claim:

1. A lighting control system comprising:
a plurality of luminaires powerable and controllable by a common AC power source, each of said luminaires having
at least one selectively powerable HID lamp,
at least one selectively powerable LED light source;
HID electronics electrically connected to said HID lamp and selectively electrically connected to said AC power source;
LED electronics electrically connected to said LED light source and selectively electrically connected to said AC power source; and
a signal receiving controller electrically connected to said HID electronics and said LED electronics, said signal receiving controller having a power source input selectively electrically connected to said AC power source;
wherein each said signal receiving controller selectively causes said AC power source input to be supplied to either said HID electronics or said LED electronics;
a lighting controller electrically coupled with said AC power source remote from said plurality of luminaires;
wherein said lighting controller is configured to pulsingly decrease and increase the voltage between said AC power source and said power source input of said signal receiving controller of a plurality of said luminaires, thereby causing a control pulse signal to be generated at said power source input of each said signal receiving controller of a plurality of said luminaires; and
wherein said signal receiving controller of each of said luminaires is configured to recognize said control pulse signal at said power source input and after recognition of said control pulse signal to cause an alternate of said HID electronics and said LED electronics to be routed with said AC power source input.

2. The lighting control system of claim 1, wherein said HID lamp of each of said luminaires is enclosed in a primary light source housing and said LED light source of each of said luminaires is provided external to said primary light source housing.

3. The lighting control system of claim 2, wherein said LED light source of each of said luminaires is provided on an arm coupled to said primary light source housing.

4. The lighting control system of claim 3, wherein said control pulse signal is a dual pulse signal, whereby the connection between said AC power source and said power source input of said signal receiving controller of a plurality of said luminaires is removed for a first removal period, then restored for a first restoral period, then removed for a second removal period, and then restored for at least a second restoral period.

5. The lighting control system of claim 4, wherein said first removal period, said first restoral period, and said second removal period are each at least two seconds in duration.

6. The lighting control system of claim 1, further comprising an actuable override signal receiving controller electrically connected to said lighting controller, wherein actuation of said override signal receiving controller causes said lighting controller to pulsingly decrease and increase the voltage between said AC power source and said AC power source input of said signal receiving controller of a plurality of said luminaires.

7. The lighting control system of claim 1, further comprising a transformer electrically interposed between said AC power source and said signal receiving controller.

8. A lighting control system comprising:
a plurality of luminaires, each of said luminaires being coupled to a pole and having
a primary light source housing coupled to said pole;
at least one selectively powerable HID lamp enclosed in said primary light source housing and electrically connected to an HID ballast, said HID lamp selectively producing a directed HID light output;
a longitudinally extending LED arm assembly extending from the pole, said LED arm assembly having a selectively powerable secondary LED light source coupled thereto, said LED light source having a plurality of LEDs electrically connected to at least one driver and selectively producing a directed LED light output;
wherein the luminosity of said HID light output is at least two times greater than the luminosity of said LED light output;
a signal receiving controller electrically coupled to an AC power line, said at least one HID ballast, and said at least one driver;
wherein said signal receiving controller is operable to electrically route said AC power line to either said at least one HID ballast or said at least one driver dependent on an electrical signal sent over said AC power line.

9. The lighting control system of claim 8, wherein said LED arm assembly has a downwardly facing bottom surface, said bottom surface supporting said plurality of LEDs.

10. The lighting control system of claim 9, wherein said bottom surface is substantially planar and is substantially perpendicular to the pole.

11. The lighting control system of claim 10, wherein said LED arm assembly extends between said pole and said primary light source housing.

12. The lighting control system of claim 8, further comprising an optical sensor in electrical communication with said signal receiving controller of each of said luminaires.

13. The lighting control system of claim 12, wherein said signal receiving controller prevents power on said AC power line from reaching either of said at least one HID ballast or said at least one driver when said optical sensor indicates a condition requiring artificial lighting is not present.

14. The lighting control system of claim 13, wherein said optical sensor is an ambient light sensor.

15. The lighting control system of claim 13, wherein said optical sensor is a motion sensor.

16. The lighting control system of claim 8, wherein electrical power is only provided over said AC power line when a condition requiring artificial lighting is present.

17. A lighting control system comprising:
a plurality of luminaires powerable and controllable by a common AC power source, each of said luminaires having
at least one selectively powerable first light source having associated first electronics for powering said first light source,
at least one selectively powerable second light source having associated second electronics for powering said second light source,
wherein the power consumption of said first light source is at least two times greater than the power consumption of said second light source, and
a signal receiving controller electrically connected to said first electronics and said second electronics, said signal receiving controller having a power source input selectively electrically connected to said AC power source,
wherein each said signal receiving controller selectively causes said AC power source input to be routed to either said first electronics or said second electronics;
a lighting controller electrically coupled with said AC power source remote from said plurality of luminaires;
wherein said lighting controller is configured to pulsingly remove and restore the connection between said AC power source and said power source input of said signal receiving controller of a plurality of said luminaires, thereby causing a control pulse signal to be generated at said power source input of said signal receiving controller of a plurality of said luminaires; and
wherein said signal receiving controller of each of said luminaires is configured to recognize said control pulse signal at said power source input and after recognition of said control pulse signal to cause an alternate of said first electronics and said second electronics to be routed with said AC power source input.

18. The lighting control system of claim 17, further comprising a transformer electrically interposed between said AC power source and said signal receiving controller.

19. The lighting control system of claim 17, further comprising at least one relay electrically interposed between said signal receiving controller and at least one of said first light source and said second light source.

20. The lighting control system of claim 17, wherein said first light source is routed with said AC power source input during user selected peak hours and said second light source is routed with power during said non-peak hours.

* * * * *